United States Patent [19]
Baker et al.

[11] Patent Number: 5,521,787
[45] Date of Patent: May 28, 1996

[54] DIFFERENTIAL CURRENT FAULT PROTECTION FOR A SYSTEM UTILIZING A POWER CONVERSION UNIT EXHIBITING BALANCED LOAD CHARACTERISTICS

[75] Inventors: Roy S. Baker; Kenneth C. Kramer, both of Rockford, Ill.

[73] Assignee: Sundstrand Corporation, Rockford, Ill.

[21] Appl. No.: 98,539

[22] Filed: Jul. 28, 1993

[51] Int. Cl.$^6$ .................................................. H02H 3/00
[52] U.S. Cl. ........................ 361/42; 361/44; 361/113; 361/115
[58] Field of Search ........................ 361/93, 42, 44, 361/47, 115, 36, 85, 113

[56] References Cited

U.S. PATENT DOCUMENTS

| | | | |
|---|---|---|---|
| 4,034,267 | 7/1977 | Wilson | 361/44 |
| 4,331,882 | 5/1982 | Hingorani | 361/113 |
| 4,347,540 | 8/1982 | Gary et al. | 361/47 |

Primary Examiner—Jeffrey A. Gaffin
Assistant Examiner—S. Jackson
Attorney, Agent, or Firm—Jeffery J. Makeever

[57] ABSTRACT

A system of protection which utilizes a simple circuit for the detection and isolation of single and multiple phase to phase and phase to neutral faults between a multi-phase source of electrical energy and a power conversion device driven therefrom. The circuit comprises a current transformer positioned at the neutral aspect of each phase winding of the multi-phase source of electrical energy. These current transformers sense the current generated by the source of electrical energy and produce a signal of proportional magnitude thereby. These proportional sense signals from each of the individual current transformers are transmitted to a controller which vectorially adds these signals to produce a single summed output signal. The controller monitors the percent ripple content of the summed output signal and generates an output protection signal if the percent ripple content of the monitored summed output signal exceeds a predetermined threshold value for a predetermined time interval. Means are provided responsive to the output protection signal for de-energizing the multi-phase source of electrical energy.

19 Claims, 2 Drawing Sheets

DIFFERENTIAL CURRENT FAULT PROTECTION FOR A SYSTEM UTILIZING A POWER CONVERSION UNIT EXHIBITING BALANCED LOAD CHARACTERISTICS

FIELD OF THE INVENTION

The present invention relates generally to differential current fault protection, and more particularly to differential current fault protection between a multi-phase generator unit and a power conversion unit which exhibits essentially balanced load characteristics when in fault free operation.

BACKGROUND ART

Variable speed/constant frequency (VSCF) electric power generating systems for use on aircraft are comprised of at least one source of electrical energy which converts the variable speed mechanical rotational energy of the engines to electrical energy, and at least one power conversion device which converts the variable frequency electrical energy output from the source to a constant frequency/ constant voltage output for use by the loads on the aircraft, such as lighting, radar systems, flight control computers, and so forth. To deliver this constant frequency/constant voltage electrical energy to all of these various loads, feeders are routed from the source on the engine, which is located on the wing, to the power conversion device, which is located in a power distribution center located somewhere in the body of the aircraft. On a large commercial aircraft, the distance between these two locations is often quite far.

As with any distribution system, it is important to know that what is being placed into the system, to be carried via the feeders in this case, is being delivered to its intended destination. It becomes critical in the case of the electric power generation system on an aircraft for two reasons: 1) the probability of a short circuit developing somewhere along the feeders is high because of the changing and harsh environments, including vibrational levels, temperature and pressurization, through which they are routed; and 2) the damage which can occur as a result of an electrical short circuit of a primary power feeder is so great, potentially leading to fire or explosion.

The system of protection utilized on aircraft in the past for the detection and isolation of these potentially dangerous short circuits is shown in FIG. 1. In this system a current sensing means, as represented by current transformers 6, 8, 10, is placed at the source 17 of electrical energy to monitor the flow of electric current from the source 17 into the feeders 12, 14, 16. Another current sensing means, as represented by current transformers 18, 20, 22 is then placed at the power conversion device 31 in the load distribution center to monitor the flow of electric current out of the feeders. The current transformers 6 and 18, 8 and 22, 10 and 20 operate as pairs, one pair for each phase in a multi-phase system.

The operation of each pair set is identical, and, therefore, only one pair will be discussed.

The orientation of the current transformers (CTs) are such that, during normal no-fault operation, the proportional output current signal from the source current transformer 6 flows through resistor $R_2$ in a direction 180° out of phase from that originating from the conversion device current transformer 18. The resultant voltage, as measured across resistor $R_2$, provides an indication of the fault, or differential, current. Under normal no-fault conditions the magnitude of the current sensed at both ends of the feeder are the same, and the voltage across resistor $R_2$ is zero. During fault conditions some or all of the current generated by the source is supplied to the fault, and the proportional output current signals no longer cancel each other across resistor $R_2$. The resulting voltage amplitude is monitored by circuit means 24 which generates a control output if the differential current exceeds a predetermined threshold. If the control signal is present beyond a predetermined time interval as measured by timing means 26, an output protection signal is generated indicating that a true differential current fault exists.

The problem with the protection system of the prior art is that the circuitry as discussed above must be duplicated for each phase of the multi-phase system. This adds weight and cost to the system, as well as reducing the reliability, due to the increased parts count. Another problem associated with the prior art is that the source and conversion device current transformers must be closely matched to ensure that a voltage potential is not generated when there is no fault within the system. This problem may become significant during overload and shock load conditions when the source is very hot and the conversion device is cool. Also, since the source and conversion device current transformers are physically located in different environments, electromagnetic interference (EMI) and high intensity radiated fields (HIRF) will affect the proportional output current signals differently, thus potentially creating a voltage potential across resistor $R_2$ indicating a fault when, in fact, no fault exists.

The present invention is directed to overcoming one or more of the above problems by recognizing that the power conversion device exhibits essentially balanced load characteristics under normal no-fault operation. That is to say that normally the current drawn from each phase of a multi-phase source of electrical energy is equal, regardless of the balance of the actual loading of the power conversion device by the aircraft loads supplied thereby.

SUMMARY OF THE INVENTION

It is the principle objective of the instant invention to provide a new and improved system of protection against differential current faults for electric power generating systems. More specifically, the instant invention provides a system of protection which utilizes a simple circuit for the detection and isolation of single and multiple phase to phase and phase to neutral faults in a zone of protection extending from a multi-phase source of electrical energy to a power conversion device driven therefrom.

In accordance with the instant invention, at least one multi-phase source of electrical energy is connected by power feeders to a power conversion device which transforms the electric power generated by the multi-phase source to a form acceptable to the loads connected thereto. The power conversion device utilized exhibits essentially balanced load characteristics as viewed from the multi-phase source of electrical energy during normal no-fault operation.

This essentially balanced loading of the multi-phase source by the power conversion device allows for the use of a single current sensor for each phase of the multi-phase source, positioned at the entrance of the zone of protection, to provide differential current protection for the zone, as opposed to the use of two sensors for each phase, one positioned at the entrance of the zone of protection and one at the exit, as required by the prior art and illustrated in FIG. 1. The sensor of the instant invention, as represented by a current transformer, senses the current generated by the multi-phase source and produces output current signals of proportional magnitude thereby. These proportional sense signals from each of the individual sensors are transmitted to a controller which vectorially adds these signals to produce a single summed output signal. The controller monitors ripple of this summed output signal, which is defined as the difference in current magnitude of the highest phase in relation to the lowest phase, and calculates the percent ripple content in relation to full scale of the summed output signal. The controller generates an output protection signal if the percent ripple content of the monitored summed output signal exceeds a predetermined threshold value for a predetermined time interval.

Means are provided responsive to the output protection signal generated by the controller for de-energizing the multi-phase source of electrical energy. This serves to stop the generation and flow of electrical current in response to a fault within the zone of protection. To extend this zone of protection to include each phase winding of the multi-phase source of electrical energy, which is important as differential current type faults often occur as a result of a short circuit within the source itself, the current transformers are positioned at the neutral aspect of each phase winding of the multi-phase source of electrical energy.

A method of protecting against differential current faults between the multi-phase source of electrical energy and the power conversion device exhibiting essentially balanced load characteristics comprises sensing the electrical current generated in each phase of the multi-phase source of electrical energy; summing the sensed current to produce a summed output signal; monitoring the percent ripple content of the summed output signal; and generating an output control signal if the percent ripple content of the summed output signal exceeds a predetermined threshold value.

A preferred method further comprises timing the duration of the output control signal and issuing an output protection signal when the duration of the output control signal exceeds a predetermined time interval.

Additionally, the preferred method further comprises de-energizing the multi-phase source of electrical energy when the output protection signal is issued.

Other objectives and advantages will become apparent from the following specification taken in conjunction with the accompanying drawings.

BRIEF DESCRIPTION OF THE DRAWINGS

Reference is now made to the Description of the Preferred Embodiments, taken in conjunction with the accompanying illustrations, in which.

DESCRIPTION OF THE PREFERRED EMBODIMENTS

Figure 1:
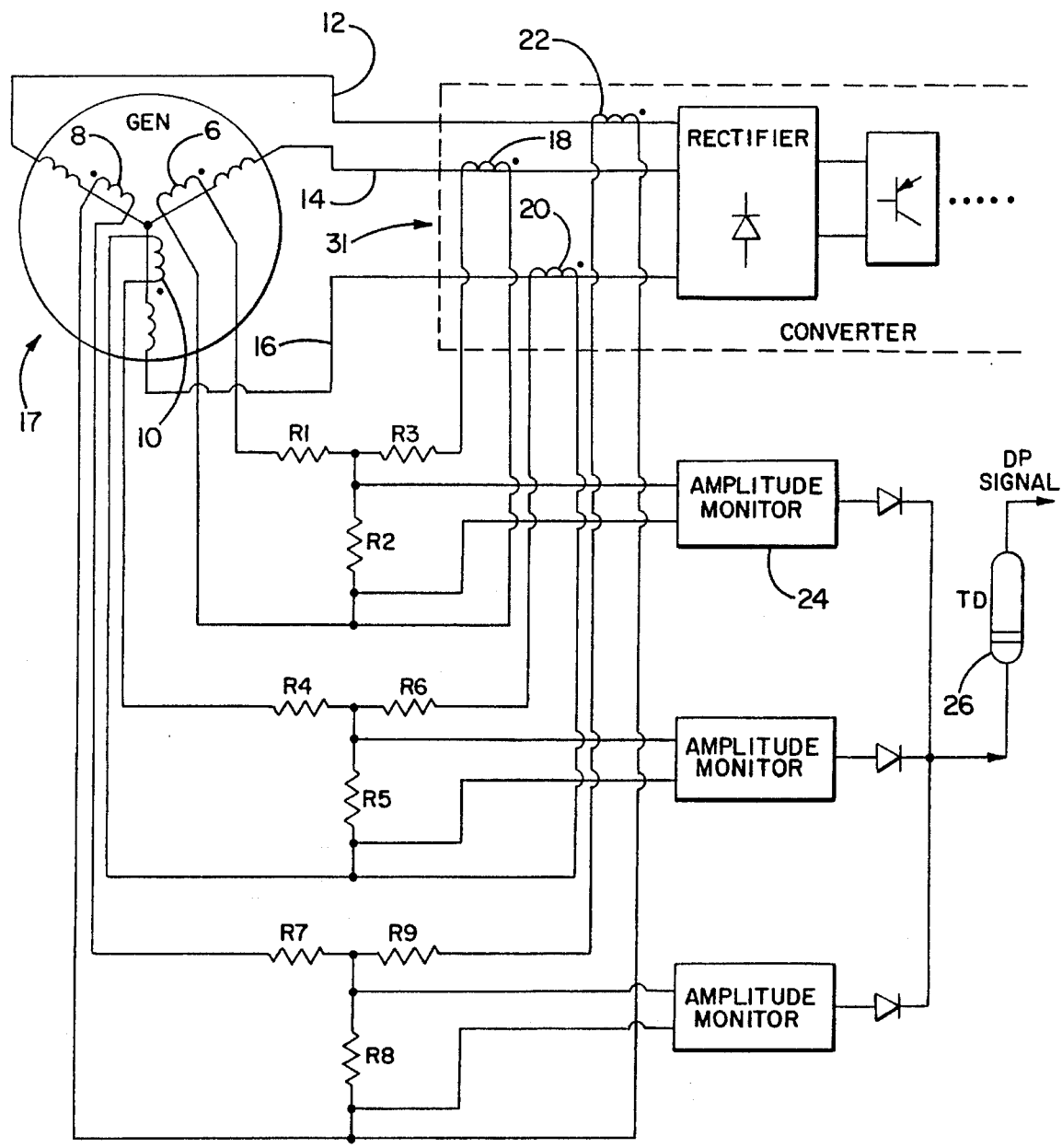
FIG. 1 illustrates a schematic of the prior art differential protection system for the zone protected by the present invention.
Figure 2:
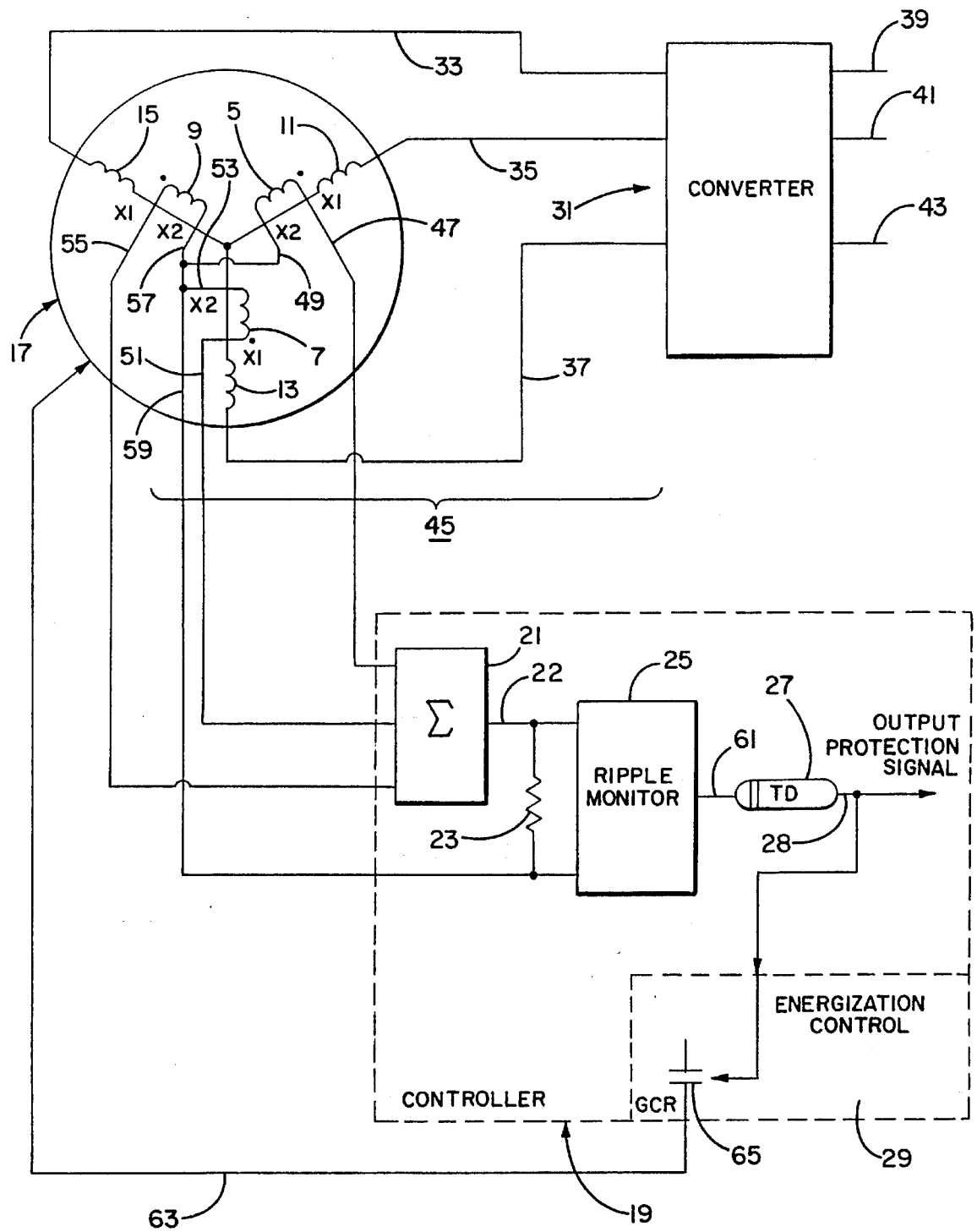
FIG. 2 illustrates a schematic of the present invention differential protection for the zone extending from the neutral aspect of the variable speed generator to the power conversion unit.

In the preferred embodiment of the instant invention as illustrated in FIG. 2, a multi-phase source of electrical energy 17 is connected by current conducting means 33, 35, 37, hereinafter referred to as power feeders, to the input of a power conversion device 31. The output of the power conversion device 31 is connected by other power feeders 39, 41, 43 to the power utilization equipment which is distributed throughout the aircraft. The power conversion device 31 can utilize various topologies in the instant invention, such as DC link, cycloconverter, transformer/rectifier, converter regulator, etc., provided the power draw from the generator 17 is balanced during normal, no-fault operation regardless of the balance of the power draw on the power conversion device 31 by the distributed power utilization equipment. It should be noted as well that although the multi-phase source of electrical energy 17 is depicted as a three phase generator 17, any balanced multi-phase source may be employed with the instant invention, and we do not, therefore, wish to be limited by this illustrative example.

Current sensing means, as embodied by current transformers 5, 7, 9 in FIG. 2, are positioned at the neutral aspect of each phase winding 11, 13, 15 of the generator 17. These current transformers 5, 7, 9 define the entrance to a zone of protection 45 which extends along the power feeders 33, 35, 37 to the power input of the power conversion device 31. The current transformers 5, 7, 9 each have two leads 47 and 49, 51 and 53, 55 and 57 denoted X1 and X2, with X1 47, 51, 55 being the dot lead and X2 49, 53, 57 being the return lead. The return leads 49, 53, 57 are connected to form a single return lead 59, and this single return lead 59 is routed with the three dot leads 47, 51, 55 to a controller 19.

The controller 19 is typically located near the converter 31, and may be integral thereto based on other system considerations. Within the controller 19, the three dot leads 47, 51, 55 are inputed to a summing means 21. The output 22 of the summing means 21 is connected to a first terminal of a burden resistor 23 whose other terminal is connected to the single return lead 59. Circuit means 25 are connected across the burden resistor 23 to monitor the percent ripple content of the signal present thereacross.

The output 61 of the circuit monitoring means 25 is coupled to the input of a timing means 27, whose output 28 is coupled to the generator energization control 29. The energization control 29 will open the generator control relay (GCR) 65 to interrupt the excitation power flow to the generator 17 along the exciter line 63 in response to the timing means output 28.

In the preferred embodiment of the instant invention as illustrated in FIG. 2, the current transformers 5, 7, 9 positioned at the neutral aspect of the generator 17 sense the electrical current generated by the generator 17 which is flowing into the zone of protection 45. This positioning of the current transformers 5, 7, 9 allows the zone of protection 45 to be extended to include the phase windings 11, 13, 15 of the generator themselves, which is important as differential current type faults often occur as a result of a short circuit within the generator 17.

The current transformers 5, 7, 9 produce output current signals of proportional magnitude to the actual sensed current generated by the generator 17, and transmit these proportional sense signals along leads 47, 51, 55, 59 to the controller 19 which, among other functions, vectorially adds these signals by use of the summing means 21 to produce a single summed output current signal at line 22. This summed output current signal on line 22 is transformed into a voltage signal across burden resistor 23 for further processing within the controller.

The percent ripple content of the summed output signal as seen across burden resistor 23 is monitored by monitoring means 25, is transmitted to the timing means 27, and generates an output protection signal at point 28 if the percent ripple content of the monitored summed output signal exceeds a predetermined threshold value for a predetermined time interval as measured by timing means 27. Under normal, no-fault operation the ripple content of the summed output signal is essentially negligible due to the essentially balanced load characteristics exhibited by the power conversion device 31 as seen by the generator 17. If a single or multiple phase to phase or phase to neutral fault occurs on the power feeders 33, 35, 37 in the zone of protection 45 of the instant invention from the generator 17 to the power conversion device 31, the percent ripple of the summed output signal as monitored across burden resistor 23 will rise beyond the predetermined threshold, thus providing indication of the fault.

In a highly preferred embodiment of the instant invention, means 29 are provided responsive to the output protection signal at point 28 generated within the controller 19 for opening the generator control relay (GCR) 65, thus breaking the excitation power flow along line 63, de-energizing the generator 17 thereby. This action serves to stop the generation and flow of electrical current along power feeders 33, 35, 37 in response to a fault within the zone of protection 45.

A further embodiment of the instant invention utilizes a percent ripple threshold as monitored across burden resistor 23 by monitoring means 25 of less than 10 percent to generate the output control signal at line 61, and a time interval of less than 100 milliseconds to generate the output protection signal at line 28. More specifically, a percent ripple content of greater than 5 percent to 9 percent for a time interval beyond 40 milliseconds to 90 milliseconds will generate the output protection signal at line 28.

The method of protecting against differential current faults which may occur in the zone of protection 45 between the generator 17 and the power conversion device 31 employed in the preferred embodiment of the instant invention comprises the steps of sensing the electrical current generated in each phase 11, 13, 15 of the generator 17, summing the sensed current from each phase 11, 13, 15 of the generator 17 to produce a summed output signal, monitoring the percent ripple content of the summed output signal, and generating an output control signal when the percent ripple content of the summed output signal exceeds a predetermined threshold.

A highly preferred method further comprises the steps of timing the duration of the output control signal, and issuing an output protection signal when the duration of the output control signal exceeds a predetermined time interval.

Most preferably, the method further comprises the step of de-energizing the generator 17 when the output protection signal is issued.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An electric power generating system having differential current fault protection, comprising:

at least one multi-phase variable frequency source of electrical energy;

a power conversion device exhibiting essentially balanced load characteristics during normal operation including a power input and a power output, first current conducting means connecting an electrical load to said power output, second current conducting means connecting said multi-phase source of electrical energy to said power input for transmitting electric power thereto;

means for sensing electrical current generated by said multi-phase source of electrical energy, said sensing means producing output current signals proportional to the magnitude of the current sensed thereby; and a controller, responsive to said proportional output current signals, for summing said proportional output current signals and for discerning the percent ripple content contained therein, said controller further generating an output protection signal in response to the percent ripple content being greater than a predetermined threshold value for a predetermined time interval.

2. An electric power generating system having differential current fault protection as recited in claim 1, wherein said predetermined time interval is set to a value less than 100 milliseconds.

3. An electric power generating system having differential current fault protection as recited in claim 1, wherein said predetermined threshold value is set to a value less than 10% ripple content.

4. An electric power generating system having differential current fault protection as recited in claim 1, further comprising means responsive to said output protection signal for de-energizing said multi-phase source of electrical energy, said de-energizing means stopping the generation of current thereby.

5. An electric power generating system having differential current fault protection as recited in claim 4, wherein said sensing means comprises a current transformer positioned at the neutral aspect of each phase winding of said multi-phase source of electrical energy, said current transformer sensing the electrical current generated therein and producing a proportional sense signal thereby.

6. An electric power generating system having differential current fault protection as recited in claim 5, wherein said predetermined time interval is set to a value less than 100 milliseconds.

7. An electric power generating system having differential current fault protection as recited in claim 6, wherein said predetermined threshold value is set to a value less than 10% percent ripple content.

8. An electric power generating system having differential current fault protection as recited in claim 7, wherein said predetermined time interval is set within the range from 40 milliseconds to 70 milliseconds, and further wherein said predetermined threshold value is set within the range from 5% ripple content to 9% ripple content.

9. A circuit for discerning the presence of a differential current fault in a zone of protection extending from a multi-phase variable frequency source of electrical energy to a power conversion device exhibiting essentially balanced load characteristics, comprising:

means positioned at the entrance of the zone of protection for sensing electrical current flowing into the zone, said sensing means producing output current signals proportional to the magnitude of the current sensed thereby;

circuit means coupled to said sensing means for vectorially summing said output current signals, said summing means producing a summed output signal; and circuit means coupled to said summing means for monitoring the percent ripple content of said summed output signal, said monitoring means producing an output control signal when the percent ripple content of said summed output signal exceeds a predetermined threshold value.

10. A circuit for discerning the presence of a differential current fault in a zone of protection extending from a multi-phase source of electrical energy to a power conversion device exhibiting essentially balanced load characteristics as recited in claim 9, wherein said sensing means comprises a current transformer positioned at the neutral aspect of each phase winding of the source of electrical energy.

11. A circuit for discerning the presence of a differential current fault in a zone of protection extending from a multi-phase source of electrical energy to a power conversion device exhibiting essentially balanced load characteristics as recited in claim 9, wherein said predetermined threshold value is set to a value less than 10% ripple content.

12. A circuit for discerning the presence of a differential current fault in a zone of protection extending from a multi-phase source of electrical energy to a power conversion device exhibiting essentially balanced load characteristics as recited in claim 9, further comprising circuit means coupled to said monitoring means for timing the duration of the presence of said output control signal, said timing means producing an output protection signal if said output control signal is present beyond a predetermined time interval.

13. A circuit for discerning the presence of a differential current fault in a zone of protection extending from a multi-phase source of electrical energy to a power conversion device exhibiting essentially balanced load characteristics as recited in claim 12, wherein said sensing means comprises a current transformer positioned at the neutral aspect of each phase winding of the source of electrical energy.

14. A circuit for discerning the presence of a differential current fault in a zone of protection extending from a multi-phase source of electrical energy to a power conversion device exhibiting essentially balanced load characteristics as recited in claim 13, wherein said predetermined time interval is set to a value less than 100 milliseconds.

15. A circuit for discerning the presence of a differential current fault in a zone of protection extending from a multi-phase source of electrical energy to a power conversion device exhibiting essentially balanced load characteristics as recited in claim 14, wherein said predetermined threshold value is set to a value less than 10% ripple content.

16. A circuit for discerning the presence of a differential current fault in a zone of protection extending from a multi-phase source of electrical energy to a power conversion device exhibiting essentially balanced load characteristics as recited in claim 15, wherein said predetermined time interval is set within the range from 40 milliseconds to 70 milliseconds, and further wherein said predetermined threshold value is set within the range from 5% ripple content to 9% ripple content.

17. A method of protecting against differential current faults between a multi-phase variable frequency source of electrical energy and a power conversion device exhibiting essentially balanced load characteristics, comprising the steps of:

(a) sensing the electrical current generated in each phase of the source of electrical energy;

(b) summing the sensed current from each phase of the source of electrical energy to produce a summed output signal;

(c) monitoring the percent ripple content of said summed output signal; and (d) generating an output control signal when the percent ripple content of said summed output signal exceeds a predetermined threshold value.

18. A method of protecting against differential current faults between a multi-phase source of electrical energy and a power conversion device exhibiting essentially balanced load characteristics as recited in claim 17, further comprising the steps of:

(e) timing the duration of said output control signal; and (f) issuing an output protection signal when the duration of said output control signal exceeds a predetermined time interval.

19. A method of protecting against differential current faults between a multi-phase source of electrical energy and a power conversion device exhibiting essentially balanced load characteristics as recited in claim 18, further comprising the steps of:

(g) de-energizing the source of electrical energy when said output protection signal is issued.

* * * * *